(12) United States Patent
Maeno et al.

(10) Patent No.: US 7,494,115 B2
(45) Date of Patent: Feb. 24, 2009

(54) FLUID-FILLED VIBRATION DAMPING DEVICE

(75) Inventors: Hajime Maeno, Kasugai (JP); Atsushi Muramatsu, Komaki (JP); Hironori Koyama, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 314 days.

(21) Appl. No.: 11/367,510

(22) Filed: Mar. 6, 2006

(65) Prior Publication Data

US 2006/0202399 A1    Sep. 14, 2006

(30) Foreign Application Priority Data

Mar. 14, 2005    (JP)    ............... 2005-071810

(51) Int. Cl.
F16F 5/00    (2006.01)
F16M 1/00    (2006.01)

(52) U.S. Cl. ............... 267/140.13; 267/140.15

(58) Field of Classification Search ........... 267/140.13, 267/140.14, 140.15, 140.11
See application file for complete search history.

(56) References Cited

U.S. PATENT DOCUMENTS

| 5,145,156 A | 9/1992 | Muramatsu et al. |
| 6,224,045 B1 | 5/2001 | Muramatsu et al. |
| 6,755,401 B2 * | 6/2004 | Akasa et al. ............ 267/140.11 |
| 7,025,341 B2 * | 4/2006 | Ichikawa et al. ....... 267/140.14 |
| 7,188,830 B2 * | 3/2007 | Kato et al. ............. 267/140.14 |

FOREIGN PATENT DOCUMENTS

| JP | A 4-277341 | 10/1992 |
| JP | U 5-77642 | 10/1993 |
| JP | B2 2843088 | 10/1998 |
| JP | A 11-264436 | 9/1999 |

* cited by examiner

Primary Examiner—Melody M Burch
(74) Attorney, Agent, or Firm—Oliff & Berridge, PLC

(57) ABSTRACT

A fluid-filled type vibration damping device including: a primary fluid chamber partially constituted by a main rubber elastic body connecting a first and second mounting member; an equilibrium chamber partially constituted by a flexible film; a partition member supported by the second mounting member; and a partition rubber film is superimposed against the partition member and secured interlocking with an annular interlocking projection projecting from the partition member. A first seal rubber is compressed between the interlocking projection and the tubular fitting member and extending about the entire circumference, thereby forming a working air chamber therebetween. A gap is furnished between and a second seal rubber is compressed between the tubular fitting member and the orifice member, and extending about the entire circumference.

9 Claims, 5 Drawing Sheets

FLUID-FILLED VIBRATION DAMPING DEVICE

INCORPORATED BY REFERENCE

The disclosure of Japanese Patent Application No. 2005-071810 filed on Mar. 14, 2005 including the specification, drawings and abstract is incorporated herein by reference in its entirety.

BACKGROUND OF THE INVENTION

1. Field of the Invention

The present invention generally relates to a fluid-filled type vibration damping device that exhibits vibration-damping effect based on fluid action of a non-compressible fluid sealed within its interior, and more particularly to a fluid-filled type vibration damping device wherein a partition member, which partitions a primary fluid chamber and an equilibrium chamber both having the non-compressible fluid sealed therein, having a partition rubber film disposed therein so that the partition rubber film partially define the pressure receiving chamber; and wherein an air chamber is formed for restricting or allowing deformation of the partition rubber film.

2. Description of the Related Art

A fluid-filled vibration damping device is known as one type of vibration damping coupling and vibration damping support for installation between members constituting a vibration transmission system, such as an automotive engine mount or body mount. This fluid-filled type vibration damping device includes: a first mounting member and a second mounting member disposed apart from one another and linked by a rubber elastic body; a primary fluid chamber having part of its wall constituted by the rubber elastic body and having a non-compressible fluid sealed therein; an equilibrium chamber formed on the opposite side from the primary fluid chamber with a partition member supported on the second mounting member situated therebetween, whose wall is partially defined by a flexible film and having a non-compressible fluid sealed therein; and an orifice passage formed in the partition member through which the primary fluid chamber and the equilibrium chamber communicate with one another so that vibration damping effect is produced on the basis of flow action of the fluid flowing through the orifice passage.

As taught in JP-B2-2843088 and JP-A-4-277341 for example, there has also been proposed a construction in which a rubber elastic film constituting another part of the wall of the primary fluid chamber is disposed on the partition member, and a working air chamber is formed on the opposite side of the rubber elastic film from the primary fluid chamber. This vibration damping device has vibration damping characteristics that can be adjusted, for example, by controlling the air pressure exerted on the working air chamber to adjust the spring characteristics of the rubber elastic film, or by exerting pressure fluctuations on the air chamber to vibrate the rubber elastic film.

In a fluid-filled type vibration damping device of this kind having an air chamber disposed in its interior, it is important for there to be an adequate seal in the area where the partition member and the rubber elastic film are attached, so as to prevent the air in the working air chamber from entering into the fluid, or to prevent fluid from leaking from the primary fluid chamber or orifice passage through the area where the partition member and the rubber elastic film are assembled.

To address this matter, JP-U-5-77642, for example, has proposed a construction wherein the partition member has an interlocking structure composed of several members, these members being superimposed in the axial direction so as to sandwich the outside peripheral edges of the rubber elastic film, thereby holding the rubber elastic film clamped therebetween in the direction of superimposition by the partition member. In yet another structure as proposed in JP-A-11-264436, an engaging portion projects from the peripheral edge of the opening of the working air chamber, a round tubular metal fitting member is bonded by vulcanization about the outside peripheral edge of the rubber elastic film, and the tubular fitting member is externally fitted onto the engaging portion with a seal rubber layer formed on the inner circumferential surface of the tubular fitting member sandwiched therebetween, and subjected to a drawing process.

However, numerous experiments and extensive studies carried out by the inventors have revealed that, in the fluid-filled type vibration damping devices taught in JP-U-5-77642 and JP-A-11-264436 cited previously, seal performance in the area where the partition member and the rubber elastic film are attached is not yet sufficiently consistent and reliable.

In particular, in fluid-filled type vibration damping devices of conventional structure, including those taught in the four documents cited previously, when the partition member is inserted into the tubular second mounting member and the second mounting member is subjected to the drawing process from the outside in the diametrical direction, with the object of ensuring fluid-tightness in the primary fluid chamber, a gap tends to form in the area of attachment of partition member and the rubber elastic film disposed on the inside of the rubber elastic film. That is, since the shape and wall thickness dimension of the partition member are not uniform in the circumferential direction due to factors such as the shape and size of the orifice passage formed in the partition member, when in association with the drawing process compressive force is exerted by the second mounting member on the partition member, and on the tubular fitting member, irregular deformation tends to be produced in the partition member and the tubular fitting member, and the outer circumferential surface of the partition member abuts tightly against the seal rubber layer formed covering the inner circumferential surface of the second mounting member. Thus, the axially superimposed members that make up the partition member are supported in a floating state on the second mounting member, and the members tend to become eccentric to one another during the drawing process. As a result, a gap tends to form between the rubber elastic film and the partition member, through which gap air escaping from the working air chamber can become entrained in the fluid, or the orifice passage can become short circuited, making it difficult to obtain the desired vibration damping characteristics.

SUMMARY OF THE INVENTION

It is therefore one object of this invention to provide a a fluid-filled type vibration damping device of novel construction, whereby the desired vibration damping characteristics are consistently obtained, by means of ensuring adequate sealing performance in the area of attachment of the partition rubber film with the orifice member and partition member.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled type vibration damping device comprising: a first mounting member; a second mounting member; a main rubber elastic body elastically connecting the first and second mounting members; a primary fluid chamber whose wall is partially constituted by the main rubber elastic body; an equilibrium chamber whose wall is partially constituted by a flexible film, a partition member supported by the second mounting member such that the primary fluid chamber and equilibrium chamber are formed to either side thereof; a partition rubber film of generally disk shape having a tubular fitting member vulcanization bonded to an outer circumferential surface thereof, the tubular fitting member being superimposed against a center of a primary fluid chamber side face of the partition member and secured interlocking with an annular interlocking projection projecting from the partition member with a lower open end portion thereof fitting externally onto the interlocking projection; a first seal rubber is compressed between an outer circumferential surface of the interlocking projection and an inner circumferential surface of the tubular fitting member and extending about an entire circumference, thereby forming a working air chamber between opposite faces of the partition member and the partition rubber film; and an annular orifice member is superimposed against an outer circumferential portion of the partition member from a primary fluid chamber side, the partition member and the orifice member forming a first orifice passage through which the primary fluid chamber and the equilibrium chamber communicate with each other, wherein a gap is furnished between an outer circumferential surface of the tubular fitting member and an inner circumferential surface of the orifice member, and a second seal rubber is compressed between the tubular fitting member and the orifice member, and extending about an entire circumference.

In the fluid-filled type vibration damping device constructed in accordance with this mode, by disposing a first seal rubber compressed or clasped between the outer circumferential surface of the interlocking projection and the inner circumferential surface of the tubular fitting member, the opening of the working air chamber is provided with fluid-tight closure by the partition rubber film, thus ensuring adequate hermetic sealing of the working air chamber.

Accordingly, in this mode, during assembly of the orifice member and partition member, it is possible, due to the gap disposed between the outer circumferential surface of the tubular fitting member and the inner circumferential surface of the orifice member, to reduce or eliminate high levels of stress and strain produced in the tubular fitting member when the outer circumferential surface of the tubular fitting member and the inner circumferential surface of the orifice member come into abutment with one another, where the orifice member or partition member undergoes irregular deformation in the diametrical direction, or where the two members are eccentric to one another. Additionally, on the basis of elastic deforming action of the second seal rubber disposed clasped between the outer circumferential surface of the tubular fitting member and the inner circumferential surface of the orifice member, pressure produced between the outer circumferential surface of the tubular fitting member and the inner circumferential surface of the orifice member is absorbed, whereby the occurrence of high levels of stress and strain in the tubular fitting member is reduced, and adequately fluid-tight sealing between these inner and outer surfaces is assured.

Thus, the tubular fitting member holds its shape well, and adequate sealing performance in the area of attachment of the partition rubber film with the orifice member and partition member is assured. Accordingly, is afforded the function of preventing leakage from the primary fluid chamber and a high level of hermetic sealing of the working air chamber, so that the desired vibration damping action is consistently achieved.

A second mode of the invention provides a fluid-filled type vibration damping device according to the first mode, wherein the second mounting member has a generally round tubular shape, a seal rubber layer is formed on an inner circumferential surface of the second mounting member, and the first mounting member is disposed apart from an opening of the second mounting member on a first side thereof in an axial direction, with the first mounting member and the second mounting member being elastically connected by the main rubber elastic body thereby providing fluid-tight closure to the opening of the second mounting member on the first side in the axial direction, and with an opening of the second mounting member on an other side in the axial direction being provided with fluid-tight closure by the flexible film, and wherein the partition member and the orifice member are disposed inserted within the second mounting member, and the second mounting member is subjected to a diameter constriction process and thereby secured fitting with the outer circumferential surface of the orifice member and the partition member, with the seal rubber layer compressed therebetween.

In this mode, the inner circumferential surface of the second mounting member, and the outer circumferential surface of the orifice member and the partition member, are disposed in hermetic contact via the seal rubber layer, thus providing more advantageous fluid-tight sealing of the primary fluid chamber and the equilibrium chamber.

In this mode in particular, during diameter constriction process of the second mounting member, the orifice member and the partition member are subjected to compressive force in the diametrical direction. Since the construction of the first mode described previously has been employed, even if the orifice member or partition member should undergo irregular deformation in the diametrical direction, or the orifice member and partition member should become eccentric to one another, nevertheless, good sealing performance will be afforded in the area of attachment of the partition rubber film, the orifice member and the partition member.

A third mode of the invention provides a fluid-filled type vibration damping device according to the second mode, wherein a groove is formed extending circumferentially in the orifice member, the groove being covered by the second mounting member to form the first orifice passage.

In this mode, since the groove extends in the circumferential direction utilizing the shape of the orifice member, a large degree of freedom of design of the first orifice passage can be assured. Additionally, the first orifice passage can be realized easily, since the first orifice passage is formed by covering the groove with the second mounting member.

A fourth mode of the invention provides a fluid-filled type vibration damping device according to any one of the first through third modes, wherein the tubular fitting member is directly exposed, at least at the outer circumferential surface of the lower end portion thereof externally fitted about the interlocking projection.

In this mode, since the tubular fitting member is exposed at its lower end with no interposed elastic rubber or the like, when the interlocking projection is inserted into the lower end of the tubular fitting member and subjected to a diameter constriction process, the dimensional accuracy of the diameter constriction process is improved. Sealing of the working air chamber is further improved thereby.

A fifth mode of the invention provides a fluid-filled type vibration damping device according to any one of the first through fourth modes, wherein the second seal rubber is formed projecting in the axial direction from the upper end face of the tubular fitting member, with the second seal rubber compressed in the axial direction between the tubular fitting member and the orifice member.

A sixth mode of the invention provides a fluid-filled type vibration damping device according to any one of the first through fifth modes, wherein the second seal rubber is formed projecting from the outer circumferential surface of the tubular fitting member, with the second seal rubber compressed in the diametrical direction between the tubular fitting member and the orifice member.

In the fifth and sixth modes, by situating the second seal rubber compressed at a specific location depending on the required fabricating efficiency and sealing properties as well as vibration damping characteristics, it is possible to further improve sealing performance in the area of the attachment of the partition rubber film, the partition member and the orifice member.

A seventh mode of the invention provides a fluid-filled type vibration damping device according to any one of the first through sixth modes, wherein the orifice member is provided with an inner partition wall for dividing the primary fluid chamber into a pressure-receiving chamber whose wall is partially constituted by the main rubber elastic body, and an intermediate chamber whose wall is partially constituted by the partition rubber film, and wherein a second orifice passage is provided for the pressure-receiving chamber and the intermediate chamber to communicate with one another.

In this mode, on the basis of deformation of the partition rubber film, it is possible to adjust pressure fluctuation in the intermediate chamber. In the primary fluid chamber that includes the intermediate chamber and the pressure-receiving chamber, thus reducing high dynamic spring of the primary fluid chamber and ensuring ample fluid flow through the first orifice passage that connects the primary fluid chamber and the equilibrium chamber. By tuning the first orifice passage and the second orifice passage to difference frequency ranges, it is possible to advantageously provide vibration damping of multiple frequencies over a wide range.

An eight mode of the invention provides a fluid-filled type vibration damping device according to any one of the first through seventh modes, wherein an air passage connects with the working air chamber so that the working air chamber is subjected to external air pressure.

In this mode, it is possible to control the air pressure exerted on the working air chamber to adjust the spring characteristics of the partition rubber film, and to exert pressure fluctuations on the air chamber to vibrate the partition rubber film, whereby the vibration damping characteristics can be adjusted to advantageously bring about the desired vibration damping characteristics.

As will be apparent from the preceding description, in fluid-filled type vibration damping devices constructed according to the present invention, it is possible to reduce or eliminate high levels of stress and strain produced in the tubular fitting member when the outer circumferential surface of the tubular fitting member and the inner circumferential surface of the orifice member come into abutment with one another, due to the gap disposed between the outer circumferential surface of the tubular fitting member and the inner circumferential surface of the orifice member, such as can occur where the orifice member or partition member undergoes irregular deformation in the diametrical direction, or where the two members-are eccentric to one another. Additionally, on the basis of elastic deforming action of the second seal rubber disposed compressed between the outer circumferential surface of the tubular fitting member and the inner circumferential surface of the orifice member, pressure produced between these outside and inner circumferential surfaces is absorbed. Therefore, the occurrence of high levels of stress and strain in the tubular fitting member is reduced, and adequately fluid-tight sealing between these inside and outer circumferential surfaces is assured. Thus, shape stability of the tubular fitting member is maintained, and consistent and reliable sealing is ensured in the area of attachment of the partition rubber film, the orifice member and partition member, so that the desired vibration damping performance is consistently achieved.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
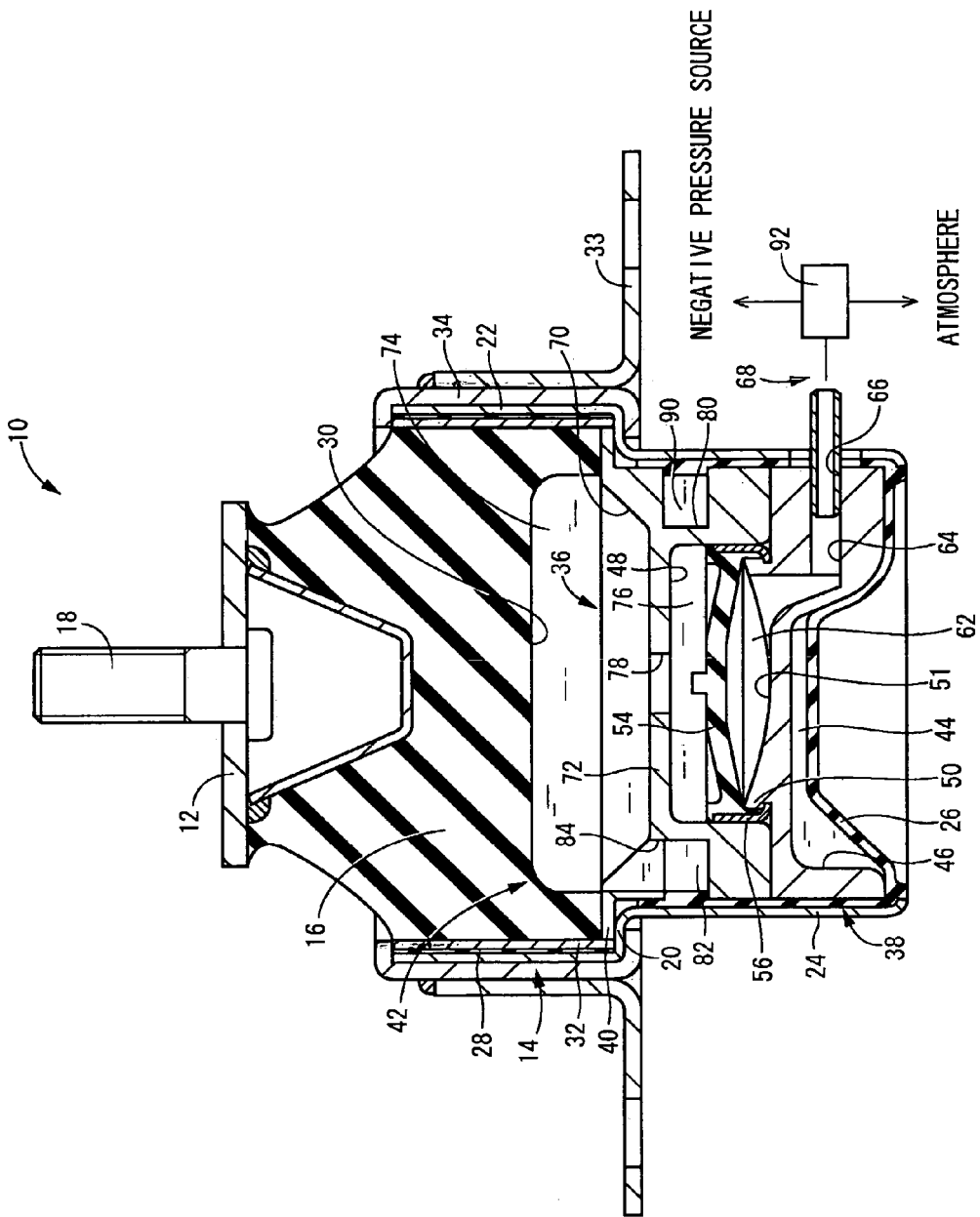
FIG. 1 is an elevational view in axial or vertical cross section of a fluid-filled type vibration damping device in the form of an automotive engine mount, which is constructed according to one preferred embodiment of the invention.
Figure 2:
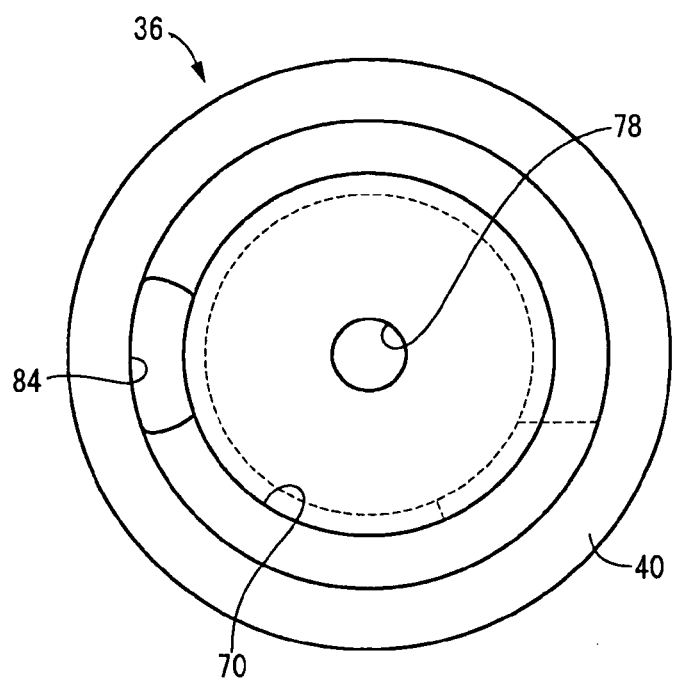
FIG. 2 is a top plane view of an orifice member of the engine mount of FIG. 1.

Referring first to FIG. 1, there is shown an automotive engine mount 10 as a first embodiment of the invention. The engine mount 10 is constructed of a first mounting member 12 of metal and a second mounting member 14 of metal, elastically connected together by a main rubber elastic body 16. The engine mount 10, in cooperation with another engine mount not shown in the drawings, supports the power unit on the body in a vibration damped manner, by means of attaching the first mounting member 12 to the power unit side and the second mounting member 14 to the body side. In the installed state, the engine mount 10, in association with elastic deformation of the main rubber elastic body 16 due to input of the distributed load of the power unit, undergoes relative displacement of the first mounting member 12 and the second mounting member 14 so that these move closer to one another a certain amount in the vertical direction; and the principal vibration to be damped is input across the first mounting member 12 and the second mounting member 14, in the approximately vertical direction in FIG. 1. With the engine mount 10 of this embodiment in the installed state, as depicted in FIG. 1, the center axis of the mounting (center axes of the first and second mounting members 12, 14) are the generally vertical direction, and thus in the description hereinbelow the vertical direction in FIG. 1 shall be designated as the vertical direction.

More specifically, the first mounting member 12 is constructed of a conical fitting attached by welding or the like to the center bottom face of a generally flat fitting. In the center of the first mounting member 12, there is integrally affixed a bolt portion 18 that extends upward (upward in FIG. 1). The first mounting member 12 is mounted to the power unit side by means of a fastener nut or the like (not shown) threaded onto the bolt portion 18.

The second mounting member 14 has a large-diameter, generally stepped round tubular shape. To either side of a step portion 20 formed in the axially medial portion are formed a large-diameter portion 22 situated above, and a small-diameter portion 24 situated below. A diaphragm 26 serving as the flexible film is vulcanization bonded to the opening at the lower end of the second mounting member 14, so that the lower opening of the second mounting member 14 is covered fluid-tightly by the diaphragm 26. The diaphragm 26 consists of thin film, and is of generally disk shape having flexibility in the center portion. A thin seal rubber layer 28 integrally formed with the diaphragm 26 is vulcanization bonded over its entirety to the inner circumferential surface of the second mounting member 14. That is, the diaphragm 26 and the seal rubber layer 28 are formed as an integrally vulcanization molded component furnished with the second mounting member 14.

The first mounting member 12 and the second mounting member 14 are spaced apart in the axial direction, with the center axes of the two mounting members 12, 14 positioned on generally the same line, and with the main rubber elastic body 16 disposed between the first mounting member 12 and the second mounting member 14.

The main rubber elastic body 16 has a large-diameter, generally frustoconcical shape, and is provided with a large-diameter recess 30 opening onto its end face on the large-diameter end. With the first mounting member 12 inserted downward in the axial direction from the small-diameter end face of the main rubber elastic body 16, it is vulcanization bonded to the main rubber elastic body 16 while positioned coaxially therewith. A thin metal sleeve 32 having a large-diameter generally round tubular shape is vulcanization bonded to the outer peripheral face of the large-diameter end of the main rubber elastic body 16. The main rubber elastic body 16 is formed as an integrally vulcanization molded component furnished with the first mounting member 12 and the metal sleeve 32.

The metal sleeve 32 is inserted into the large-diameter portion 22 of the second mounting member 14, and the large-diameter portion 22 is then subjected to drawing from all directions, or other such diameter reduction process. A support tube fitting 34 having large-diameter round tubular shape is press-fit into the large-diameter portion 22, and both ends of the support tube fitting 34 are then subjected to caulking so as to overlap the two upper edges of the metal sleeve 32 and the large-diameter portion 22, and the step portion 20 of the second mounting member 14, whereby the metal sleeve 32 and the large-diameter portion 22 of the second mounting member 14 are held compressed by the support tube fitting 34. A bracket fitting 33 is affixed to the support tube fitting 34, and the second mounting member 14 is mounted on the body by means of attaching fastening bolts or the like (not shown) to mounting members on the body side (not shown).

The seal rubber layer 28 formed covering the inner circumferential surface of the second mounting member 14 is compressed between the outer circumferential surface of the metal sleeve 32 and the inner circumferential surface of the large-diameter portion 22, so that the metal sleeve 32 and the large-diameter portion 22 mate fluid-tightly. By so doing, the upper opening of the second mounting member 14 is provided with fluid-tight closure by the main rubber elastic body 16, while a sealed fluid zone hermetically sealed from the outside space and having non-compressible fluid sealed therein is formed between the main rubber elastic body 16 and the diaphragm 26 on the inside of the second mounting member 14. As the non-compressible fluid it is possible to use water, an alkylene glycol, a polyalkylene glycol, silicone oil or the like. In terms of effectively achieving vibration damping action on the basis of flow action such as resonance action of the fluid, it is preferable to use a low-viscosity fluid having viscosity of 0.1 Pa·s or lower.

The small-diameter portion 24 of the second mounting member 14 houses an orifice member 36 of metal and a partition member 38 of metal. As illustrated in FIGS. 2-5 the orifice member 36 and partition member 38 have the form of thick, generally annular blocks fabricated of rigid material including metal material such as aluminum alloy, or synthetic resin material such as FRP. A flange portion 40 is integrally formed at the upper end of the orifice member 36. The orifice member 36 and the partition member 38 are superimposed against one another in the axial direction, and inserted into the small-diameter portion 24 from the upper opening of the second mounting member 14, with the flange portion 40 of the orifice member 36 supported superimposed against the step portion 20 of the second mounting member 14. By then subjecting the small-diameter portion 24 of the second mounting member 14 to drawing from all directions or other such diameter reduction process, the outer circumferential surface of the orifice member 36 and the outer circumferential surface of the partition member 38 are positioned in close contact against the inner circumferential surface of the second mounting member 14, with the seal rubber layer 28 interposed therebetween, whereby the second mounting member 14 is fit securely to the orifice member 36 and the partition member 38.

By so doing, the sealed fluid zone mentioned previously is partitioned fluid-tightly by the orifice member 36 and the partition member 38. To one side (the upper side in FIG. 1) of the orifice member 36 and the partition member 38 in the sealed fluid zone there is formed a primary fluid chamber 42 a portion of whose wall is constituted by the main rubber elastic body 16, and in which pressure fluctuations are produced based on elastic deformation of the main rubber elastic body 16 during vibration input. On the other side (the lower side in FIG. 1) of the orifice member 36 and the partition member 38 in the sealed fluid zone there is formed an equilibrium chamber 44 a portion of whose wall is constituted by the diaphragm 26, and which readily permits change in capacity based on deformation of the diaphragm 26. Sealing of the non-compressible fluid is accomplished, for example, by performing assembly of the main rubber elastic body 16 integrally vulcanization molded component furnished with the first mounting member 12, the orifice member 36, and the partition member 38 with the second mounting member 14 while they are immersed in the non-compressible fluid. A lower recess 46 is formed on the lower end face of the partition member 38, opening onto the center portion, whereby adequate capacity of the equilibrium chamber 44 is advantageously assured by the lower recess 46.

In the orifice member 36 is formed a center recess 48 opening onto the center of the lower face. With the orifice member 36 and the partition member 38 superimposed against one another in the axial direction, the opening of the center recess 48 is covered by the partition member 38. From the center upper face of the partition member 38, an annular interlocking projection 50 projects into the center recess 48, positioned to the inside of the center recess 48. Optionally, a circular recess 51 is formed to the inside of the interlocking projection 50 on the center upper face of the partition member 38. An interlocking groove 52 having a substantially unchanging recessed cross section all the way around the circumference is formed on the outer peripheral face of the interlocking projection 50 in proximity to the basal end.

An elastic rubber film 54 of generally disk shape serving as the partition rubber film is attached between the partition member 38 and the orifice member 36. A fitting ring 56 serving as the tubular fitting member is vulcanization bonded to the outer circumferential surface of the elastic rubber film 54.

The fitting ring 56 is of generally annular shape, and is fabricated of rigid material having the required strength and heat resistance sufficient to withstand vulcanization molding of the elastic rubber film 54; it can be fabricated using iron or aluminum alloy, for example. At the lower end portion of the fitting ring 56 an interlocking portion 58 that deflects diametrically inward is integrally formed so as to extend all the way around in the circumferential direction.

Figure 6:
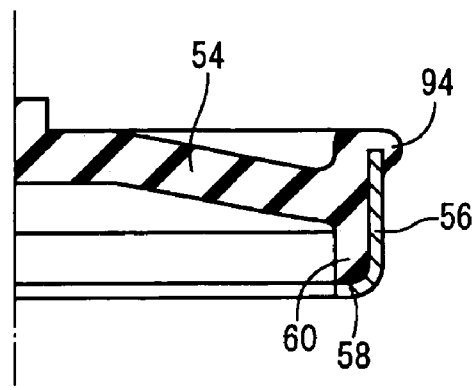
FIG. 6 is an enlarged cross sectional view of a principle part of an integrally vulcanization product consisting of a rubber elastic film and a fitting ring used in the engine mount of FIG. 1.

The inner circumferential surface of the fitting ring 56 from the axially medial portion to the upper end portion is vulcanization bonded to the outer circumferential surface of the elastic rubber film 54. The inner circumferential surface of the fitting ring 56 from the axially medial portion to the lower end portion (interlocking portion 58), on the other hand, is vulcanization bonded to the outer circumferential surface of an annular first seal rubber 60 integrally formed with the elastic rubber film 54 and extending downward from the outside peripheral edge of the elastic rubber film 54. In this integrally vulcanization molded component of the elastic rubber film 54 and the first seal rubber 60 furnished with the fitting ring 56, in its individual component state prior to being assembled between the orifice member 36 and the partition member 38, the inner circumferential surface of the first seal rubber 60 is generally coplanar with the projecting distal end face of the interlocking portion 58, as shown in FIG. 6.

In this embodiment in particular, in the axially medial portion and the lower end where the interlocking portion 58 is formed, the outer circumferential surface of the fitting ring 56 is not covered by the elastic rubber film 54, the first seal rubber 60, or other rubber elastic body, but is rather directly exposed.

The lower end opening of the fitting ring 56 is fitted about the exterior of the interlocking projection 50 of the partition member 38, and the fitting ring 56 is subjected to diameter constriction from the outside. By so doing, the elastic rubber film 54 is superimposed against the center of the face situated on the primary fluid chamber 42 side of the partition member 38, i.e. against the center upper face of the partition member 38 furnished with the interlocking projection 50, and affixed to the partition member 38, extending in the axis-perpendicular direction so as to cover the opening of the interlocking projection 50 in its entirety. The interlocking portion 58 enters with the interlocking groove 52 of the interlocking projection 50 and is detained interlocked therewith, preventing the fitting ring 56 from becoming upwardly detached from the interlocking projection 50.

The first seal rubber 60 formed on the inner circumferential surface of the lower end portion of the fitting ring 56 (interlocking portion 58) undergoes elastic deformation and is held compressed between the inner circumferential surface of the fitting ring 56 and the outer circumferential surface of the interlocking projection 50. The lower end opening of the fitting ring 56 is thereby covered fluid-tightly, forming a gap between the elastic rubber film 54 and the partition member 38, the gap constituting a working air chamber 62 partitioned fluid-tightly from the primary fluid chamber 42 and the equilibrium chamber 44.

An air pressure passage 64 is also formed in the partition member 38; a first end of the air pressure passage 64, opens onto the center upper face of the partition member 38 and connects with the working air chamber 62, while the other end opens into an exposed port portion 66 formed on the outer circumferential surface of the partition member 38. With the mounting installed on a vehicle, an air line 68 is connected to the port portion 66, whereby air pressure is exerted on the working air chamber 62 from the air line 68 via the air pressure passage 64, so that the pressure in the working air chamber 62 can be adjusted from the outside. The air pressure passage 64 pertaining to this embodiment is constituted to include both the air pressure passage 64 and the air line 68.

The fitting ring 56 fitted onto the interlocking projection 50 of the partition member 38 fits internally within the center recess 48 of the orifice member 36, with the proximity of the opening of the center recess 48 being partitioned by the elastic rubber film 54.

An upper recess 70 that opens onto the primary fluid chamber 42 side is formed on the upper face of the orifice member 36, and a flat inner dividing wall 72 is formed between the center recess 48 and the upper recess 70 of the orifice member 36.

By means of this inner dividing wall 72, the center recess 48 is partitioned fluid-tightly, forming to one side (the top in FIG. 1) of the inner dividing wall 72 a pressure-receiving chamber 74 whose wall is constituted in part by the main rubber elastic body 16; and forming to the other side (the bottom in FIG. 1) of the inner dividing wall 72 an intermediate chamber 76 whose wall is constituted in part by the elastic rubber film 54. In other words, the intermediate chamber 76 is formed within the center recess 48 of the orifice member 36, on the opposite side of the elastic rubber film 54 from the working air chamber 62.

A through-hole 78 is bored in the center portion of the inner dividing wall 72, and on the basis of the flow action of fluid through this through-hole 78, pressure is transmitted between the pressure-receiving chamber 74 and the intermediate chamber 76. The pressure transmission level can be adjusted on the basis of design modification of the shape, size, and length of the through-hole 78.

Figure 3:
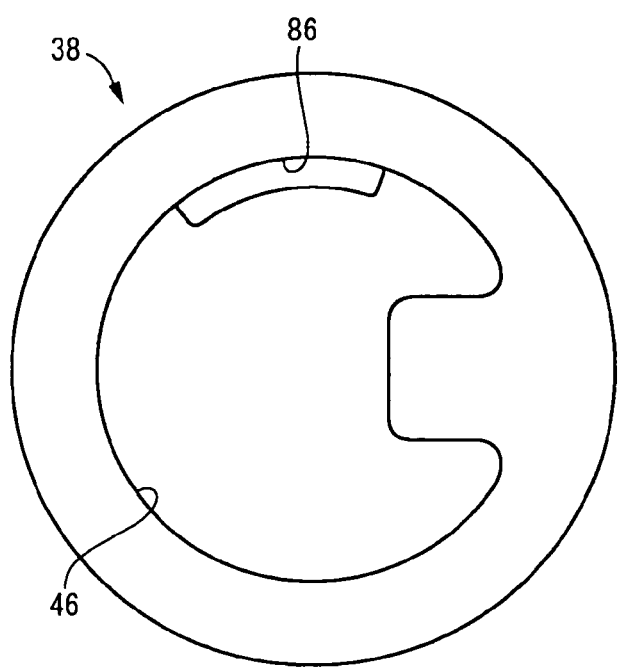
FIG. 3 is a bottom plane view of a partition member of the engine mount of FIG. 1.
Figure 4:
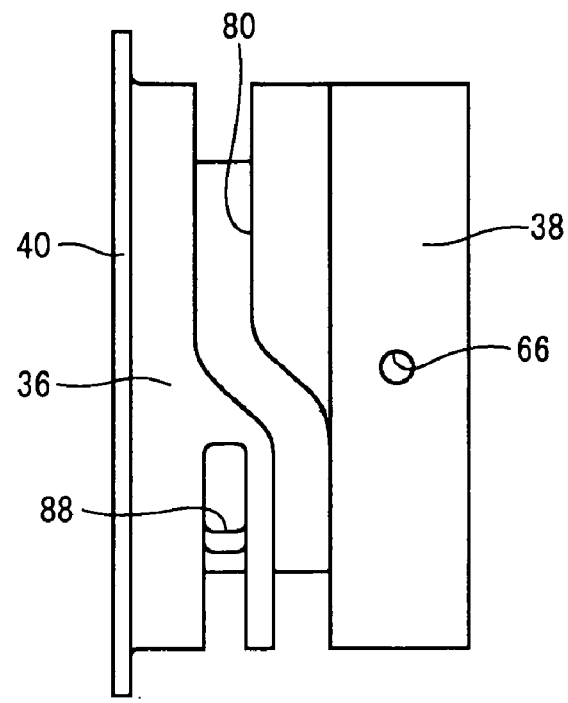
FIG. 4 is a side elevational view of the orifice member of FIG. 2 and the partition member of FIG. 3 are assembled together.
Figure 5:
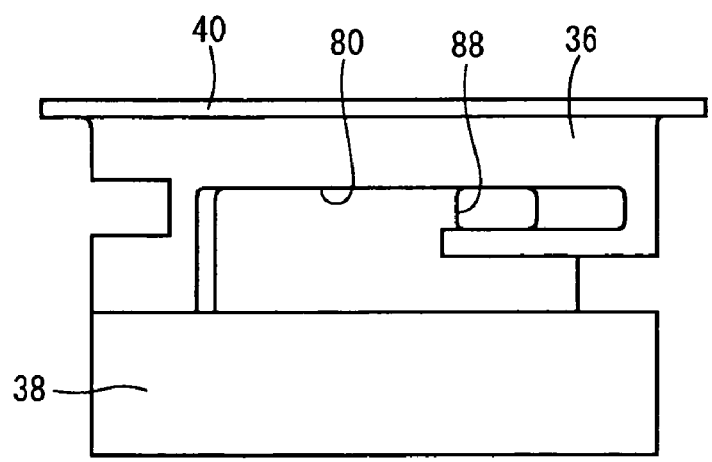
FIG. 5 is a front elevational view of the orifice member of FIG. 2 and the partition member of FIG. 3 are assembled together.

A groove 80 extending a predetermined length in the circumferential direction (e.g. just over half the circumference) is formed on the outer circumferential surface of the orifice member 36. The groove 80 is covered fluid-tightly by the second mounting member 14 via the seal rubber layer 28 formed on the inner circumferential surface of the second mounting member 14, forming a first orifice passage 82. A first end of the first orifice passage 82 connects with the pressure-receiving chamber 74 via a through-hole 84 bored in the upper end of the orifice member 36, while the other end connects with the equilibrium chamber 44 via a through-hole 86 bored in the partition member 38, as illustrated in FIG. 3 as well. That is, by means of the first orifice passage 82, the pressure-receiving chamber 74 and the equilibrium chamber 44 are connected to one another, permitting fluid flow between the two chambers 44, 74 through the first orifice passage 82.

In this embodiment in particular, the resonance frequency of fluid caused to flow through the first orifice passage 82 is tuned so that on the basis of resonance action of the fluid, there is produced effective vibration damping action (high attenuating action) against vibration in a low-frequency range of around 10 Hz, corresponding to engine shake and the like.

A communicating window 88 is formed in the peripheral wall of the center recess 48 which constitutes the floor portion of the groove 80. In this embodiment, the communicating window 88, the groove 80, and the through-hole 86 of the partition member 38 cooperate to constitute a second orifice passage 90, with the intermediate chamber 76 and the equilibrium chamber 44 communicating with each other through this second orifice passage 90. That is, the groove 80 in the portion extending to the through-hole 86 of the partition member 38 from the communicating window 88 making up part of the second orifice passage 90 is also used for the first orifice passage 82.

The resonance frequency of fluid caused to flow through the second orifice passage 90 is tuned to a frequency range of 20-40 Hz corresponding to idling vibration and the like, on the basis of resonance action of the fluid. By so doing, the second orifice passage 90 is tuned to a higher frequency range than the first orifice passage 82, and during input of high-frequency vibration, effective vibration-damping action (vibration insulating action through lower dynamic spring) is exhibited on the basis of resonance action of the fluid caused to flow through the second orifice passage 90.

Tuning of the first and second orifice passages 82, 90 may be carried out, for example, by adjusting the passage length and passage cross sectional area of each of the orifice passages 82, 90, while giving consideration to the spring rigidity of the walls of the intermediate chamber 76 (a characteristic value corresponding to the pressure change needed to produce a change in unit volume) and the like. Typically, the frequencies at which the phase of pressure fluctuations through the orifice passages 82, 90 shift to a state of resonance can be understood to be the tuning frequencies of the orifice passages 82, 90.

When installed in a vehicle, the air line 68 is connected to the port portion 66 formed in the partition member 38, and the working air chamber 62 is connected to a switching valve 92 through the air line 68. This switching valve 92 consists, for example, of an electromagnetic valve, and the working air chamber 62 can be selectively placed in communication with the atmosphere or with a prescribed negative pressure source. The switching valve 92 can be placed under appropriate switching control depending on vehicle driving conditions and the like, so that in the engine mount 10, effective vibration damping is exhibited against vibration input under various conditions.

The switching valve 92 is connected to a control device, not shown in the drawing. In this control device, necessary items from among information of various kinds indicating the condition of the automobile provided by sensors disposed in the automobile such as the vehicle speed, engine rpm, gear shift position, throttle opening, and so on; and on the basis of this information, switching operation of the switching valve 92 is carried out in accordance with a preset program, by microcomputer software or the like.

As depicted in FIG. 6, a second seal rubber 94 is formed projecting from the outer circumferential surface of the upper end of the fitting ring 56 attached to the elastic rubber film 54. The second seal rubber 94 is integrally formed with the elastic rubber film 54 and extends continuously in the circumferential direction with a generally unchanging semispherical cross section, as well as extending over the upper edge of the fitting ring 56 in the diametrical direction. The second seal rubber 94, by being positioned at the upper end of the fitting ring 56, is not positioned in diametrical opposition to the first seal rubber 60 formed covering the inner circumferential surface of the lower end of the fitting ring 56.

As noted previously, the fitting ring 56 is fitted externally onto the interlocking projection 50 of the partition member 38, and the lower end of the fitting ring 56 not covered by the second seal rubber 94 is subjected to a diameter constriction process. Accordingly, the lower end is reliably constricted in diameter and the interlocking portion 58 of the fitting ring 56 interlocks securely with the interlocking groove 52 of the interlocking projection 50, with the first seal rubber 60 compressed interposed between the inner circumferential surface of the fitting ring 56 and the outer circumferential surface of the partition member 38 (the interlocking projection 50).

Figure 7:
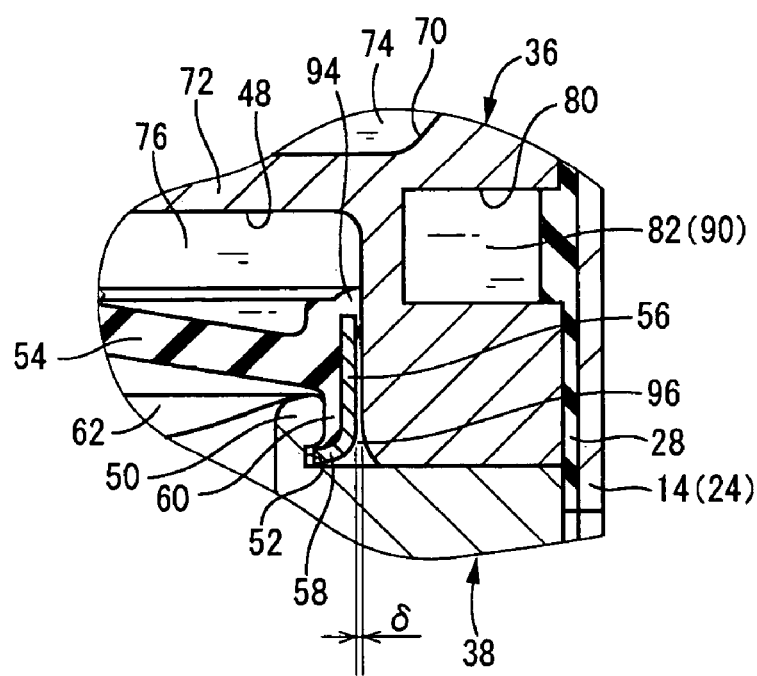
FIG. 7 is an enlarged cross sectional view of a principle part of the engine mount of FIG. 1.

Of particular note, the outside diameter dimension of the fitting ring 56 subsequent to the diameter constriction process is smaller by a prescribed size than the inside diameter dimension of the peripheral wall portion of the orifice member 36 which makes up the peripheral wall portion of the center recess 48. With this arrangement, as depicted in enlarged view in FIG. 7, when the fitting ring 56 is fitted into the center recess 48, a gap 96 of inside dimension: δ extending all the way around the circumference is formed between the outer circumferential surface of the fitting ring 56 and the inner circumferential surface of the orifice member 36.

While the inside dimension: δ of the gap 96 in this embodiment is unchanging about the entire circumference, it is not particularly limited thereto and may vary in the circumferential direction, for example. Additionally, the gap 96 may be eliminated entirely or in part by means of displacement or deformation of the orifice member 36 or the partition member 38 in association with diameter constriction of the second mounting member 14. In other words, during diameter constriction of the second mounting member 14, the inner circumferential surface of the orifice member 36 and the outer circumferential surface of the fitting ring 56 may come partly or entirely into abutment against one another, on the basis of relative displacement or deformation of the orifice member 36 and the partition member 38.

When the fitting ring 56 is fitted into the center recess 48 of the orifice member 36, the second seal rubber 94 covering the fitting ring 56 is press-fit into the center recess 48. Then, the upper end face of the partition member 38 around the fitting ring 56 and the lower end face of the orifice member 36 around the center recess 48 are superimposed in the axial direction, and the second seal rubber 94 undergoes elastic deformation due to being compressed in the diametrical direction between the outer circumferential surface of the fitting ring 56 and the inner circumferential surface of the orifice member 36 that constitutes the peripheral wall portion (face) of the center recess 48. By means of this, the intermediate chamber 76 and the gap 96 are partitioned fluid-tightly, and adequate fluid-tightness of the intermediate chamber 76 is ensured.

In the engine mount 10 of this construction, when low-frequency, large amplitude vibration, such as engine shake for example, is input, pressure fluctuation of very large amplitude is produced in the pressure receiving chamber 74. During this pressure fluctuation, the intermediate chamber 76 is substantially nonfunctional. Under these conditions, sufficient fluid flow through the first orifice passage 82 caused by the relative pressure fluctuation produced between the pressure-receiving chamber 74 and the equilibrium chamber 44 when vibration is input is effectively assured; and on the basis of resonance action of the fluid caused to flow through the first orifice passage 82, effective vibration damping action (high damping effect) of engine shake is produced. With regard to vibration damping action of low-frequency, large amplitude vibration, since the intermediate chamber 76 has substantially no action, the working air chamber 62 may be connected to either the outside air or to a negative pressure source.

During input of high-frequency, small amplitude vibration, such as idling vibration, having higher frequency than the tuning frequency of the first orifice passage 82, pressure fluctuation of a certain amplitude are produced in the pressure-receiving chamber 74. During this pressure fluctuation, the first orifice passage 82, which is tuned to a somewhat lower frequency range, experiences very large fluid flow resistance due to anti-resonance action, becoming substantially blocked off.

That is, the arrangement is such that under these conditions, the intermediate chamber 76, in which is produced an effective pressure fluctuation similar to that in the pressure-receiving chamber 74, is connected with the variable-capacity equilibrium chamber 44 through the second orifice passage 90 tuned to the high frequency range. Thus, sufficient fluid flow through the second orifice passage 90 caused by the relative pressure fluctuation produced between the pressure-receiving chamber 74, the intermediate chamber 76 and the equilibrium chamber 44 when vibration is input is effectively assured, and effective vibration damping (vibration insulating effect based on low spring characteristics) is produced on the basis of resonance action of the fluid caused to flow through the second orifice passage 90.

In this embodiment, when vibration of the tuning frequency range of the second orifice passage 90 is input, the working air chamber 62 may be connected to either the outside air or to a negative pressure source. This setting can be made according to the required vibration damping characteristics, or switched appropriately.

In short, in this embodiment, the spring characteristics of the elastic rubber film 54 constituting the wall of the intermediate chamber 76 varies, .depending on whether the working air chamber 62 is connected to the outside air or connected to a negative pressure source. First, with the working air chamber 62 connected to the outside air, the elastic rubber film 64 is in the unconstricted state, and soft spring characteristics are produced. With the working air chamber 62 connected to a negative pressure source, on the other hand, the elastic rubber film 54, suctioned by negative pressure, deforms towards the working air chamber 62 side, and under more intense suction the elastic rubber film 54 becomes superposed against the floor of the working air chamber 62 (the upper end face of the partition member 38), thereby assuming a state of constrained deformation so that hard spring rigidity is produced. Thus, the wall spring rigidity of the intermediate chamber 76 differs where the working air chamber 62 is connected to the outside air, versus where it is connected to the negative pressure source. As a result, the tuning frequency of the second orifice passage 90 changes, and the frequency at which effective vibration damping action is produced changes as well. As will be apparent from the preceding description, the spring characteristics of the elastic rubber film 54 are not as soft as the diaphragm 26, and has spring rigidity such that pressure fluctuations produced in the intermediate chamber 76 when high-frequency, low amplitude vibration such as idling vibration is input are not absorbed on the basis of elastic deformation thereof, so pressure fluctuations sufficient to create fluid flow through the second orifice passage 90 can be produced in the intermediate chamber 76.

Accordingly, by switching the switching valve 92 to selectively connect the working air chamber 62 to the outside air or the negative pressure source, between conditions of normal idling and conditions of fast idling such as those encountered at startup or when running the air conditioner, it becomes possible to more precisely tune the second orifice passage 90 to idling vibration of different frequencies in a range of several Hz to several tens of Hz even in a high frequency range, so as to achieve even better vibration damping action thereof.

In the present invention, it is not mandatory to reset the tuning of the second orifice passage 90 by switching the switching valve 92 with reference to vehicle status, in the frequency range in which idling vibration occurs. For example, in instances where change of idling vibration is relatively small, it is possible to keep the working air chamber 62 normally connected to the negative pressure source in the idling state, so as to more advantageously ensure adequate fluid flow through the second orifice passage 90 in this state; and to achieve a higher level of vibration damping effect by means of tuning so as to produce more effective vibration damping action of idling vibration.

When high-frequency, very low-amplitude vibration, such as drive rumble, of higher frequency than the tuning frequency of the second orifice passage 90 is input, a pressure fluctuation of small amplitude is produced in the pressure-receiving chamber 74. During this pressure fluctuation, the pressure fluctuation in the pressure-receiving chamber 74 is transmitted to the intermediate chamber 76 through the through-hole 78, and fluid pressure absorbing action is produced based on elastic deformation of the elastic rubber film 54 in the intermediate chamber 76. That is, when high-frequency, very low-amplitude vibration is input, fluid pressure absorbing action is produced by the intermediate chamber 76 and the elastic rubber film 54, and the pressure fluctuation of the pressure-receiving chamber 74 is absorbed in the intermediate chamber 76, thus avoiding high dynamic spring behavior by the mounting.

During input of high-frequency, very low-amplitude vibration, the first orifice passage 82 and the second orifice passage 90, which are tuned to a lower frequency range, each experience very large fluid flow resistance due to anti-resonance action, becoming substantially blocked off.

Specifically, under these conditions, the pressure-receiving chamber 74 and the intermediate chamber 76 into which the pressure thereof has escaped are each in a state of being independently isolated from the equilibrium chamber 44; however, the elastic rubber film 54 constituting part of the wall of the intermediate chamber 76 permits elastic deformation relatively easily due to the fact that the working air chamber 62 formed to the rear thereof is open to the outside air. In particular, the elastic rubber film 54 has soft spring characteristics, such that the extent of pressure fluctuations in the intermediate chamber 76 produced when driving rumble or other such high-frequency, very low-amplitude vibration is input can be sufficiently absorbed on the basis of elastic deformation thereof.

Consequently, pressure fluctuations escaping from the pressure-receiving chamber 74 to the intermediate chamber 76 when vibration is input will be absorbed in the intermediate chamber 76 on the basis of elastic deformation of the elastic rubber film 54. As a result, marked high dynamic spring behavior due to the first and second orifice passages 90 becoming substantially blocked off is avoided, and good vibration damping effect against high-frequency, very low-amplitude vibration (vibration insulating effect based on low dynamic spring characteristics) is produced.

In the engine mount 10 which pertains to the present embodiment, when in the manner described previously the second mounting member 14 is subjected to a diameter reduction process, fluid-tightly superimposing the inner circumferential surface of the second mounting member 14 (small-diameter portion 24) against the outer circumferential surface of the orifice member 36 and the outer circumferential surface of the partition member 38, compressing force is exerted on the orifice member 36 and the partition member 38 in the diametrical direction about the entire circumference. During this process, due to the fact that the orifice member 36 and the partition member 38 have non-uniform shape in the circumferential direction due to the first and second orifice passages 82, 90, the air pressure passage 64, and so on being formed in the orifice member 36 and the partition member 38, it is conceivable that the orifice member 36 and the partition member 38 may experience irregular deformation in the circumferential direction, or that the two fittings 36, 38 may become eccentric to one another.

Accordingly, in this embodiment, a gap 96 is furnished between the outer circumferential surface of the fitting ring 56 and the inner circumferential surface of the orifice member 36, and the second seal rubber 94 is interposed compressed therebetween, so that even if the distance between the opposing outer circumferential surface of the fitting ring 56 and inner circumferential surface of the orifice member 36 should vary in an irregular manner, significant stress or strain produced in the fitting ring 56 as a result of contact between these outside and inner circumferential surfaces may be reduced or avoided, and a good seal between the outside and inner circumferential surfaces may be maintained on the basis of elastic deformation of the second seal rubber 94.

Consequently, adequate seal performance is assured in the attachment area of the elastic rubber film 54 with orifice member 36 and the attachment area of the elastic rubber film 54 with the partition member 38. Accordingly, fluid leakage from the intermediate chamber 76 and short circuiting of the second orifice passage 90 can be advantageously prevented, so the desired vibration damping action is effectively achieved.

While the invention has been described in detail hereinabove based on a certain preferred embodiment, the invention is in no way limited by the specific description in the embodiment, and various changes, modifications, and improvements thereof will be apparent to the skilled practitioner, which embodiments will also be considered to fall within the scope of the invention insofar as they do not depart from the spirit of the invention.

For example, whereas in the preceding embodiment the second seal rubber 94 is formed projecting from the outer circumferential surface of the fitting ring 56, and is compressed between the fitting ring 56 and the orifice member 36, the invention is not limited to the exemplary embodiment. Accordingly, another specific example of the invention will be described making reference to FIGS. 8-9. In the description hereinbelow, members and areas of substantially identical structure as in the preceding embodiment will be assigned the same numerals in the drawings as the preceding embodiment, and will not be described in any detail.

Figure 8:
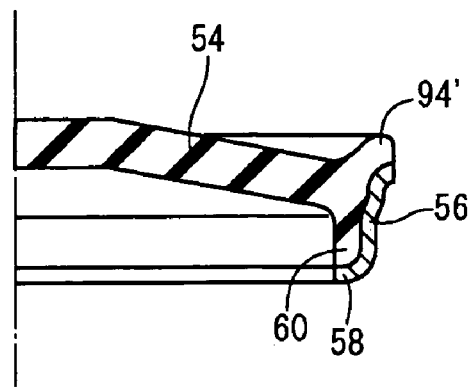
FIG. 8 is an enlarged cross sectional view of a principle part of an integrally vulcanization product consisting of a rubber elastic film and a fitting ring of construction used in another embodiment of an engine mount according to the invention.
Figure 9:
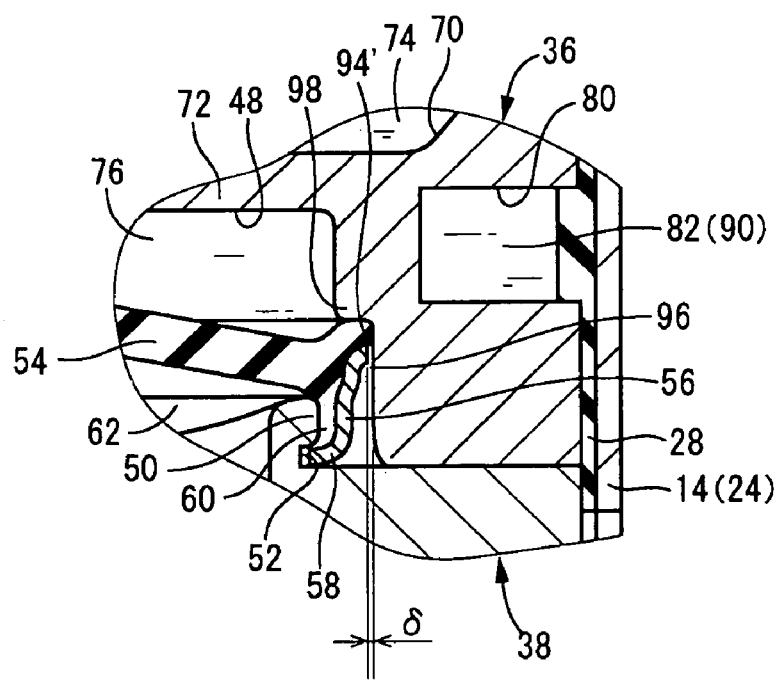
FIG. 9 is an enlarged cross sectional view of a principle part of the engine mount of FIG. 8, corresponding to FIG. 7.

In another acceptable arrangement illustrated in FIGS. 8-9, a second seal rubber 94' integrally formed with the elastic rubber film 54 projects in the axial direction from the lower end face of the fitting ring 56, and an annular step portion 98 is disposed projecting diametrically inward from the upper peripheral wall portion of the orifice member 36. The fitting ring 56 is inserted into the center recess 48 and superimposed in the axial direction against the orifice member 36 and the partition member 38, while the second seal rubber 94' is interposed compressed between the fitting ring 56 and the step portion 98, so that a fluid-tight seal is produced between the inner circumferential surface of the orifice member 36 and the outer circumferential surface of the fitting ring 56 on the basis of elastic deforming action of the second seal rubber 94'.

The second seal rubber 94' of this embodiment is not limited to the exemplary structure, shape and size depicted here. For instance, by combining the second seal rubber 94 projecting from the outer circumferential surface of the fitting ring 56 as described in the preceding embodiment with the second seal rubber 94' projecting from the outer circumferential surface of the fitting ring 56 as described in the specific example above, the second seal rubber 94 can be compressed between the fitting ring 56 and the orifice member 36 in both the axial and diametrical directions.

In the preceding embodiment, the fitting ring 56 is of straight tube shape, and the outer circumferential surface thereof, excluding the lower end where the interlocking portion 58 of the fitting ring 56 is formed, is formed a generally unchanging distance apart from the inner circumferential surface of the orifice member 36; however, as depicted in FIGS. 8-9, the fitting ring 56 may instead curve and bow so as to gradually spread diametrically outward from the lower end to the upper end, providing, a gap 96 between the outer circumferential surface of the upper end of the fitting ring 56 and the inner circumferential surface of the orifice member 36.

Additionally, in the preceding embodiment, the fitting ring 56, by means of the interlocking portion 58 disposed at the lower end thereof being inserted into the interlocking groove 52 of the interlocking projection 50 of the partition member 38, is fastened securely fitting to the exterior of the interlocking projection 50. The present invention is not limited to the illustrated design, but it is possible, for example, for the lower end opening of the fitting ring 56 to be fitted externally and welded to the interlocking projection 50; or when subjecting the fitting ring 56 to the diameter constriction process, loading the fitting ring 56 in the axial direction, and fluid-tightly juxtaposing the lower end opening of the fitting ring 56 with the basal end portion of the interlocking projection, to secure fasten the fitting ring 56 to the interlocking projection.

The shape, size, construction, location, number and so on of the first and second orifice passages 82, 90 may be modified depending on the required vibration damping characteristics, production considerations, and so on, and are not limited to those taught herein by way of example.

Additionally, whereas in the preceding embodiment the inner dividing wall 72 provided to the orifice member 36 divides the primary fluid chamber 42 into the pressure-receiving chamber 74 and the intermediate chamber 76, the inner dividing wall 72 and the intermediate chamber 76 are not essential components. For example, dispensing with the inner dividing wall 72, the elastic rubber film 54 could be exposed directly to the primary fluid chamber 42, and constitute part of the wall of the primary fluid chamber 42.

Additionally, whereas in the preceding embodiment the working air chamber 62 is selectively connected to the outside air or to a negative pressure source by the switching valve 92 in order to switch the mounting vibration damping characteristics, effective vibration damping action against vibration of multiple amplitudes differing in size in the low-to high-frequency range can of course be achieved even where the working air chamber 62 is kept normally connected to the outside air via the air pressure passage 64.

Further, whereas the preceding embodiment described a specific example of the invention being implemented in an automotive engine mount 10, it is also appropriately implemented in automotive body mountings or differential mountings, or in vibration damping mountings for various kinds of non-automotive vibrating entities.

What is claimed is:

1. A fluid-filled type vibration damping device comprising:
a first mounting member;
a second mounting member;
a main rubber elastic body elastically connecting the first and second mounting members;
a primary fluid chamber whose wall is partially constituted by the main rubber elastic body;
an equilibrium chamber whose wall is partially constituted by a flexible film,
a partition member supported by the second mounting member such that the primary fluid chamber and equilibrium chamber are formed to either side thereof;
a partition rubber film of generally disk shape having a tubular fitting member vulcanization bonded to an outer circumferential surface thereof, the tubular fitting member being superimposed against a center of a primary-fluid-chamber-side face of the partition member and secured interlocking with an annular interlocking projection projecting from the partition member with a lower open end portion thereof fitting externally onto the interlocking projection;
a first seal rubber is compressed between an outer circumferential surface of the interlocking projection and an inner circumferential surface of the tubular fitting member and extending about an entire circumference, thereby forming a working air chamber between opposite faces of the partition member and the partition rubber film; and
an annular orifice member is superimposed against an outer circumferential portion of the partition member from a primary fluid chamber side, the partition member and the orifice member forming a first orifice passage through which the primary fluid chamber and the equilibrium chamber communicate with each other,
wherein a gap is furnished between an outer circumferential surface of the tubular fitting member and an inner circumferential surface of the orifice member, and a second seal rubber is compressed between the tubular fitting member and the orifice member, and extending about an entire circumference,
wherein the second mounting member is fit securely to an outer circumferential surface of the orifice member by means of a diameter constriction process, and the outer circumferential surface of the tubular fitting member has a diameter dimension smaller than a diameter dimension of the inner circumferential surface of the orifice member so that the gap is formed therebetween in the diametric direction.

2. A fluid-filled type vibration damping device according to claim 1, wherein the second mounting member has a generally round tubular shape, a seal rubber layer is formed on an inner circumferential surface of the second mounting member, and the first mounting member is disposed apart from an opening of the second mounting member on a first side thereof in an axial direction, with the first mounting member and the second mounting member being elastically connected by the main rubber elastic body thereby providing fluid-tight closure to the opening of the second mounting member on the first side in the axial direction, and with an opening of the second mounting member on an other side in the axial direction being provided with fluid-tight closure by the flexible film, and wherein the partition member and the orifice member are disposed inserted within the second mounting member, and the second mounting member is subjected to a diameter constriction process and thereby secured fitting with the outer circumferential surface of the orifice member and the partition member, with the seal rubber layer compressed therebetween.

3. A fluid-filled type vibration damping device according to claim 2, wherein a groove is formed extending circumferentially in the orifice member, the groove being covered by the second mounting member to form the first orifice passage.

4. A fluid-filled type vibration damping device according to claim 1, wherein the tubular fitting member is directly exposed, at least at the outer circumferential surface of the lower end portion thereof externally fitted about the interlocking projection.

5. A fluid-filled type vibration damping device according to claim 1, wherein the second seal rubber is formed projecting in the axial direction from an upper end face of the tubular fitting member, with the second seal rubber compressed in an axial direction between the tubular fitting member and the orifice member.

6. A fluid-filled type vibration damping device according to claim 1, wherein the second seal rubber is formed projecting from the outer circumferential surface of the tubular fitting member, with the second seal rubber compressed in a diametrical direction between the tubular fitting member and the orifice member.

7. A fluid-filled type vibration damping device according to claim 1, wherein the orifice member is provided with an inner partition wall for dividing the primary fluid chamber into a pressure-receiving chamber whose wall is partially constituted by the main rubber elastic body, and an intermediate chamber whose wall is partially constituted by the partition rubber film, and wherein a second orifice passage is provided for the pressure-receiving chamber and the intermediate chamber to communicate with one another.

8. A fluid-filled type vibration damping device according to claim 1, wherein an air passage connects with the working air chamber so that the working air chamber is subjected to external air pressure.

9. A fluid-filled type vibration damping device according to claim 1, wherein the orifice member has an annular step portion projecting diametrically inward from the inner circumferential surface thereof, and the second seal rubber is compressed between the tubular fitting ring and the annular step portion.

* * * * *